United States Patent
Baik et al.

(10) Patent No.: US 8,712,145 B2
(45) Date of Patent: Apr. 29, 2014

(54) DEPTH ESTIMATION APPARATUS AND METHOD

(75) Inventors: Aron Baik, Yongin-si (KR); Yong Ju Jung, Daejeon-si (KR); Ji Won Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 474 days.

(21) Appl. No.: 12/453,213

(22) Filed: May 1, 2009

(65) Prior Publication Data

US 2010/0135581 A1     Jun. 3, 2010

(30) Foreign Application Priority Data

Dec. 2, 2008   (KR) .................. 10-2008-0120965

(51) Int. Cl.
*G06K 9/00*   (2006.01)

(52) U.S. Cl.
USPC ........... 382/154; 382/195; 382/106; 382/107; 382/167; 345/605; 345/555

(58) Field of Classification Search
USPC .......... 382/195, 106, 107, 167, 154; 345/605, 345/555
See application file for complete search history.

(56) References Cited

U.S. PATENT DOCUMENTS

2008/0150945 A1*   6/2008   Wang et al. ................... 345/427

OTHER PUBLICATIONS

Ko et al: "2D-To-3D Stereoscopic Conversion: Depth-Map Estimation in a 2D Single-View Image", Proc. of SPIE vol. 6696, 66962A, Aug. 8, 2007.*
Zhang et al: "Stereoscopic Image Generation Based on Depth Images for 3D TV", IEEE Transactions on Broadcasting, vol. 51, No. 2, Jun. 2005.*

* cited by examiner

*Primary Examiner* — Ruiping Li
(74) *Attorney, Agent, or Firm* — Staas & Halsey LLP

(57) ABSTRACT

A depth estimation apparatus is provided. The depth estimation apparatus may estimate a depth value of at least one pixel composing an input video based on feature information about at least one feature of the input video, a position of the at least one pixel, and a depth relationship among the at least one pixel and neighboring pixels.

19 Claims, 8 Drawing Sheets

| EVEN Compute | ODD Ref. | EVEN Compute | ODD Ref. |
|---|---|---|---|
| ODD Ref. | EVEN Compute | ODD Ref. | EVEN Compute |
| EVEN Compute | ODD Ref. | EVEN Compute | ODD Ref. |
| ODD Ref. | EVEN Compute | ODD Ref. | EVEN Compute |

420

| EVEN Ref. | ODD Compute | EVEN Ref. | ODD Compute |
|---|---|---|---|
| ODD Compute | EVEN Ref. | ODD Compute | EVEN Ref. |
| EVEN Ref. | ODD Compute | EVEN Ref. | ODD Compute |
| ODD Compute | EVEN Ref. | ODD Compute | EVEN Ref. |

DEPTH ESTIMATION APPARATUS AND METHOD

CROSS-REFERENCE TO RELATED APPLICATIONS

This application claims the benefit of Korean Patent Application No. 10-2008-0120965, filed on Dec. 2, 2008, in the Korean Intellectual Property Office, the disclosure of which is incorporated herein by reference.

BACKGROUND

1. Field

One or more embodiments relate to a depth estimation apparatus and method, and more particularly, to a depth estimation apparatus and method which may provide depth information when converting a two-dimensional (2D) monocular video without depth information into a three-dimensional (3D) stereoscopic video.

2. Description of the Related Art

Currently, as interest in three-dimensional (3D) stereoscopic video increases, an increased amount of research on a 3D stereoscopic video has been conducted.

In general, a 3D effect may be obtained due to a difference between left and right eyes of a human. Accordingly, a 3D stereoscopic video may be shown using such characteristic. For example, a viewer may recognize a particular object as a 3D stereoscopic video by simultaneously displaying a left eye image, seen in a left eye of the viewer, and a right eye image seen in a right eye of the viewer.

Accordingly, a 3D stereoscopic video may be realized by producing and displaying a binocular image which is divided into a left eye image and a right eye image.

Currently, research on technologies that may convert a two-dimensional (2D) video into a 3D stereoscopic video by providing depth information to a monocular video without depth information has been conducted.

Providing depth information to a 2D video and rendering of the 2D video are desired for converting a 2D video into a 3D video. Accordingly, a technology to estimate depth information in a 2D video without depth information is desired.

SUMMARY

One or more embodiments may provide a depth estimation apparatus and method which may estimate a depth, desired for converting an input video into a three-dimensional (3D) stereoscopic video based on a feature, a position of a pixel (or block), and a depth relationship among neighboring pixels (or blocks), and thereby may convert the 2D input video into the 3D stereoscopic video based on accurate depth information.

According to one or more embodiments, there may be provided a depth estimation apparatus, including a feature information extraction unit to extract feature information about at least one feature of an input video, and a depth estimation unit to estimate a depth value of at least one pixel of the input video based on the feature information about the at least one feature, a position of the at least one pixel, and a depth relationship among the at least one pixel and pixels neighboring the at least one pixel.

According to one or more embodiments, there may be provided a depth estimation apparatus, including a feature information extraction unit to extract feature information about at least one feature of an input video a depth estimation unit to distinguish at least one pixel of the input video according to at least one block of the input video with plural pixels, and estimate a depth value of the at least one block based on the feature information about at least one feature, a position of the at least one block, and a depth relationship among the at least one block and blocks neighboring the at least one block, and an up-scaling unit to up-scale a depth map, which stores the depth value, based on the at least one pixel.

According to one or more embodiments, there may be provided a depth estimation method, including extracting feature information about at least one feature of an input video, and estimating a depth value of at least one pixel of the input video based on the feature information about the at least one feature, a position of the at least one pixel, and a depth relationship among the at least one pixel and pixels neighboring the at least one pixel.

Additional aspects, and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
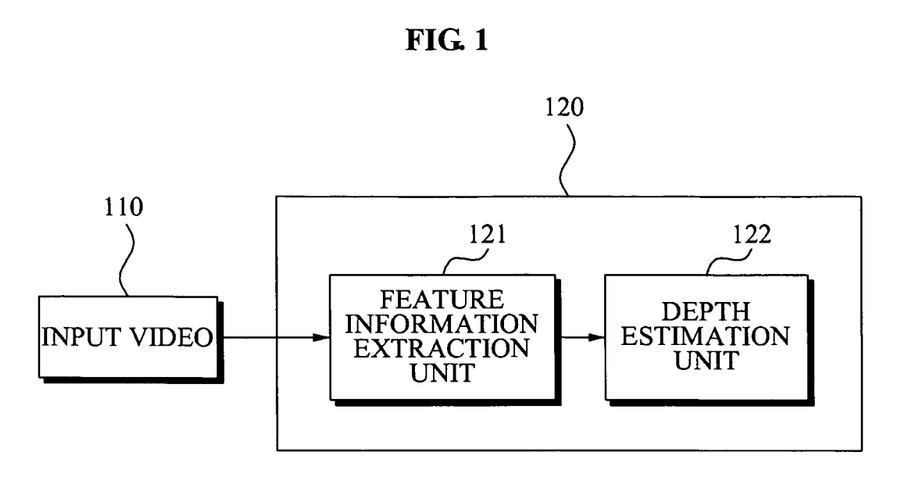
FIG. 1 illustrates a configuration of a depth estimation apparatus according to example embodiments.

FIG. 1 illustrates a configuration of a depth estimation apparatus 120 according to example embodiments.

The depth estimation apparatus 120 may include a feature information extraction unit 121 and a depth estimation unit 122.

When an input video 110 is input in the depth estimation apparatus 120, the feature information extraction unit 121 may extract feature information about at least one feature of the input video 110.

According to example embodiments, the input video 110 may be a monocular video.

Also, according to example embodiments, the feature information about the at least one feature may include information about at least one of an edge, a color, a luminance, a motion, and a histogram.

The depth estimation unit 122 may estimate a depth value of at least one pixel based on the feature information about the at least one feature, a position of the at least one pixel, and a depth relationship among the at least one pixel and neighboring pixels. The at least one pixel may compose the input video 110.

Accordingly, the depth estimation apparatus 120 may estimate the depth value of the input video 110 based on the feature information of the input video 110, the position of the at least one pixel composing the input video 110, and the depth relationship of the neighboring pixels, and thereby may convert input video 110 that is two-dimensional (2D) to a three-dimensional (3D) stereoscopic video based on accurate depth information.

The depth estimation apparatus 120 may not be limited to the above-described example embodiments illustrated in FIG. 1. Hereinafter, a variety of example embodiments of the depth estimation apparatus 120 is described in detail with reference to FIGS. 2 through 6.

Figure 2:
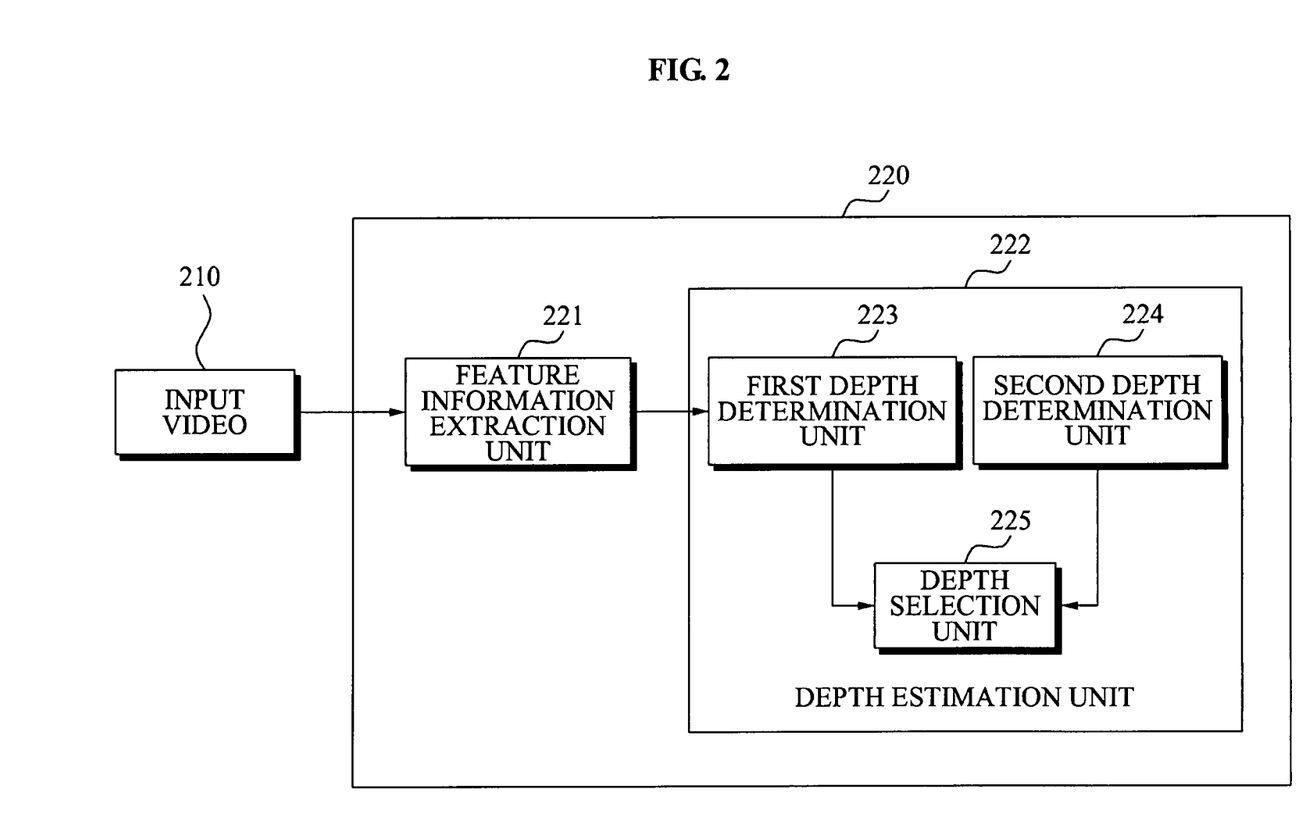
FIG. 2 illustrates a configuration of a depth estimation apparatus according to other example embodiments.

FIG. 2 illustrates a configuration of a depth estimation apparatus 220 according to other example embodiments.

The depth estimation apparatus 220 may include a feature information extraction unit 221 and a depth estimation unit 222.

When an input video 210 is input in the depth estimation apparatus 220, the feature information extraction unit 221 may extract feature information about at least one feature of the input video 210.

According to other example embodiments, the input video 210 may be a monocular video.

Also, according to other example embodiments, the feature information about the at least one feature may include information about at least one of an edge, color, luminance, motion, and histogram.

The depth estimation unit 222 may estimate a depth value of at least one pixel based on the feature information about the at least one feature, a position of the at least one pixel composing the input video 210, and a depth relationship among the at least one pixel and neighboring pixels.

According to example embodiments, the depth estimation unit 222 may include a first depth determination unit 223, a second depth determination unit 224, and a depth selection unit 225.

The first depth determination unit 223 may determine a first depth value of the at least one pixel, composing the input video 210, based on the feature information about the at least one feature.

For example, when the feature information extraction unit 221 extracts the luminance information of the input video 210, the first depth determination unit 223 may determine the first depth value of the at least one pixel based on a similarity of luminance information of the at least one pixel.

The second depth determination unit 224 may determine a second depth value of the at least one pixel based on the position of the at least one pixel.

In this instance, according to other example embodiments, the second depth determination unit 224 may determine the second depth value based on a vertical image coordinate value of the at least one pixel.

In general, an object located further away may be displayed in an upper portion of the 2D input video 210 and an object located closer may be displayed in a lower portion of the 2D input video 210. Accordingly, when the at least one pixel is located in the upper position of the input video 210, the second depth determination unit 224 may determine the second depth value as a greater value than when the at least one pixel is located in the lower position of the input video 210.

For example, it may be assumed that the second depth determination unit 224 determines a second depth value with respect to a pixel a, a pixel b, and a pixel c.

When the pixel a is located in the lower position of the input video 210, the pixel b is located in a middle of the input video 210, and the pixel c is located in the upper position of the input video 210, the second depth determination unit 224 may determine a second depth value of the pixel c to be a greater than second depth values of the pixel b and the pixel a. Also, the second depth determination unit 224 may determine the second depth value of the pixel b to be greater than the second depth value of the pixel a.

According to other example embodiments, the second depth determination unit 224 may determine the second depth value, for example, by using the following Equation 1, for example.

$$d_p(y) = \frac{Ry}{N-1} \quad \text{Equation 1}$$

Here, y may denote the vertical image coordinate value of the at least one pixel, R may denote a range of the second depth value, and N may denote a number of horizontal lines composing the input video 210. For example, when the second depth value is in a range from 0 to 255, R may be 255.

That is, as the at least one pixel is located in an upper position of the input video 210, y may increase. Accordingly, the second depth determination unit 224 may determine the second depth value as a greater value than when the at least one pixel is located in a lower position of the input video 210.

The depth selection unit 225 may select the depth value of the at least one pixel from at least one predetermined candidate depth value based on respective differences, for example, between the predetermined candidate depth value and each of the first depth value, the second depth value, and a third depth value of the neighboring pixels.

The at least one predetermined candidate depth value may include at least one of the depth value of the at least one pixel composing the input video 210, the third depth value of the neighboring pixels, and a randomly selected depth value.

In this instance, according to other example embodiments, the depth selection unit 225 may compute a first difference between the first depth value and the at least one predetermined candidate depth value.

Also, the depth selection unit 225 may compute a second difference between the second depth value and the at least one predetermined candidate depth value.

Also, the depth selection unit 225 may compute a third difference between the third depth value and the at least one predetermined candidate depth value.

Also, the depth selection unit 225 may select a value as the depth value of the at least one pixel from among the at least one predetermined candidate depth value. In this instance, the value may be a depth value associated with a minimum of sums of the first difference, the second difference, and the third difference.

An operation of the depth selection unit 225 is described in detail below.

For this, an operation of estimating a depth value of the pixel a by the depth estimation unit 222 may be detailed to describe the operation of the depth selection unit 225.

It may be assumed that the at least one predetermined candidate depth value of the pixel a, are three values, x, y, and z. Also, it may be assumed that a neighboring pixel of the pixel a is the pixel b.

The depth selection unit 225 may compute a difference between each of x, y, and z and a first depth value of the pixel a.

It may be assumed that the difference between each of x, y, and z and the first depth value of the pixel a is x', y', and z' as a result of the computation.

Also, the depth selection unit 225 may compute a difference between a second depth value of the pixel a and each of x, y, and z.

It may be assumed that the difference between the second depth value of the pixel a and each of x, y, and z is x", y", and z" as a result of the computation.

Also, the depth selection unit 225 may compute a difference between a third depth value of the pixel a and each of x, y, and z.

It may be assumed that the difference between the third depth value of the pixel a and each of x, y, and z is x''', y''', and z''' as a result of the computation.

In this instance, the depth selection unit 225 may determine a minimum sum from among the first sum, the second sum, and the third sum, and select a depth value, associated with the minimum sum, from among the at least one predetermined candidate depth value as the depth value of the pixel a. The first sum may be a sum of x', x", and x''', the second sum may be a sum of y', y", and y''', and the third sum may be a sum of z', z", and z'''.

For example, when the first sum is the minimum sum from among the first sum, the second sum, and the third sum, the depth selection unit 225 may select x as the depth value of the pixel a.

According to other example embodiments, the depth estimation apparatus 220 may determine the at least one candidate depth value with respect to the at least one pixel composing the input video 210. Then, the depth estimation apparatus 220 may select a candidate depth value, nearest to the first depth value, the second depth value, and the third depth value, as the depth value of the at least one pixel from the at least one predetermined candidate depth value. In this instance, the first depth value may be estimated based on the feature information about the input video 210, the second depth value may be estimated based on the position of the at least one pixel, and the third depth value may be associated with the neighboring pixels of the at least one pixel. Accordingly, the depth estimation apparatus 220 may accurately estimate depth information desired when converting the 2D input video 210 into the 3D video.

In this instance, according to other example embodiments, the depth selection unit 225 may apply a first weight to the first difference, a second weight to the second difference, and a third weight to the third difference to select the depth value, which is described in greater detail below.

It may be assumed that the first weight, the second weight, and the third weight are $\lambda_1$, $\lambda_2$, and $\lambda_3$, respectively.

In this case, the first sum, the second sum, and the third sum may be $\lambda_1 x'+\lambda_2 x''+\lambda_3 x'''$, $\lambda_1 y'+\lambda_2 y''+\lambda_3 y'''$, and $\lambda_1 z'+\lambda_2 z''+\lambda_3 z'''$, respectively.

In this instance, the depth selection unit 225 may determine a minimum sum from among the first sum, the second sum, and the third sum, and select a depth value, associated with the minimum sum, from among the at least one predetermined candidate depth value as the depth value of the pixel a.

For example, when the first sum is the minimum sum, the depth selection unit 225 may select x as the depth value of the pixel a.

According to other example embodiments, the depth estimation apparatus 220 may apply different weights to each of the first difference, the second difference, and the third difference, and thereby may control an influence of the feature information of the input video 210, the position of the at least one pixel, and the third depth value of the neighboring pixels when estimating the depth value of the input video 210.

The depth selection unit 225 may select the depth value of the at least one pixel using, for example, the following Equation 2, for example.

$$C(d_c) = \lambda_f |d_f - d_c| + \lambda_p |d_p - d_c| + \lambda_s \sum_{d_s \in \eta} |d_s - d_c| \quad \text{Equation 2}$$

$$d = \underset{d_c \in \zeta}{\mathrm{argmin}} \{C(d_c)\}$$

Here, $d_c$, $d_f$, $d_p$, and $d_s$ may denote the at least one predetermined candidate depth value, the first depth value, the second depth value, and the third depth value, respectively. Also, $\eta$, $\lambda_f$, $\lambda_p$, $\lambda_s$ and $\zeta$ may denote a set of the neighboring pixels of the at least one pixel, the first weight, the second weight, the third weight, and a set of the at least one predetermined candidate depth value, respectively.

As shown in Equation 2, the depth selection unit 225 may compute $C(d_c)$ with respect to the at least one predetermined candidate depth value $d_c$, and then select a candidate depth value where $C(d_c)$ is a minimum value from the set ($\zeta$) of the at least one predetermined candidate depth value as a depth value (d) of the at least one pixel.

In this instance, according to other example embodiments, the at least one predetermined candidate depth value may include at least one of the depth value of the at least one pixel composing the input video 210, the third depth value of the neighboring pixels, and a randomly selected depth value.

Also, according to other example embodiments, the depth selection unit 225 may repeat the operation of selecting the depth value of the at least one pixel.

Figure 3:
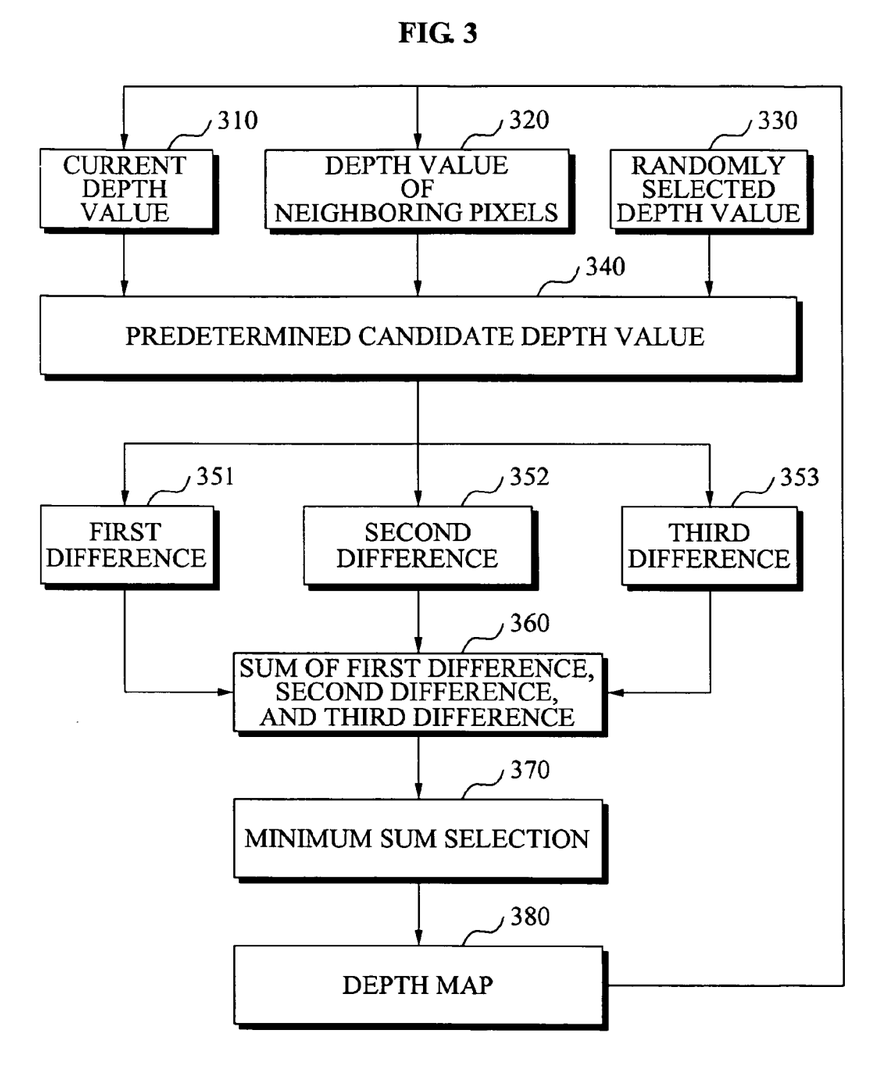
FIG. 3 illustrates an operation of a depth selection unit according to example embodiments.

FIG. 3 illustrates an operation of a depth selection unit 225 according to other example embodiments.

Referring to FIGS. 2 and 3, a predetermined candidate depth value 340 may include a current depth value 310 of the at least one pixel composing the input video 210, a depth value 320 of the neighboring pixels of the at least one pixel, and a randomly selected depth value 330.

A depth selection unit 225 may compute a first difference 351, a second difference 352, and a third difference 353 using the predetermined candidate depth value 340, and the first depth value, the second depth value, and the third depth value, respectively.

Also, the depth selection unit 225 may apply a first weight to the first difference 351, a second weight to the second difference 352, and a third weight to the third difference 353, and thereby may further compute a sum 360 of the first difference 351, the second difference 352, and the third difference 353.

Also, the depth selection unit 225 may select from a minimum sum 370 a candidate depth value as the depth value of the at least one pixel from among the predetermined candidate depth value 340. The candidate value may be a depth value associated with a minimum of sums of the first difference 351, the second difference 352, and the third difference 353.

When the depth value of the at least one pixel is selected from the minimum sum 370, the selected depth value may be stored in a depth map 380 to be used for rendering the input video 210 to a 3D stereoscopic video.

In this instance, the depth selection unit 225 may reuse the stored depth value of the at least one pixel as the depth value 310 of the at least one pixel and the depth value 320 of the neighboring pixels from among the predetermined candidate depth value 340. Accordingly, the depth selection unit 225 may repeat the operation of selecting the depth value of the at least one pixel.

For example, it may be assumed that the input video 210 includes a pixel a, a pixel b, and a pixel c. Also, it may be assumed that the pixel b and the pixel c are neighboring pixels of the pixel a.

When a depth value selected once with respect to the pixel a is x, a depth value selected with respect to the pixel b is y, and a depth value selected with respect to the pixel c is z as a result of the depth value selection illustrated in FIG. 3, the depth selection unit 225 may reuse x, y, and z as the predetermined candidate depth value 340. Accordingly, the depth selection unit 225 may repeat the depth value selection illustrated in FIG. 3.

In this instance, when it may be assumed that the depth selection unit 225 selects a depth value of the pixel a, x may be a current depth value 310 with respect to the pixel a from among the predetermined candidate depth value 340, and each of y and z may correspond to the depth value 320 of the neighboring pixels from among the predetermined candidate depth value 340.

That is, a depth value selected by the depth selection unit 225 in a previous frame may be used as a candidate depth value to select a depth value in a current frame.

Accordingly, the depth estimation apparatus 220 may repeat selecting the depth value of the at least one pixel, and thereby may accurately estimate the depth value of the input video 210.

According to other example embodiments, the depth estimation apparatus 220 may simultaneously perform the operation of selecting the depth value with respect to each of the at least one pixel composing the input video 210.

For example, it may be assumed that a pixel a, a pixel b, and a pixel c compose the input video 210.

In this instance, the depth estimation apparatus 220 may separately and simultaneously estimate a depth value of each of the pixel a, the pixel b, and the pixel c.

An example of simultaneously estimating a depth value in the depth estimation apparatus 220 is described in detail with reference to FIG. 4.

Figure 4:
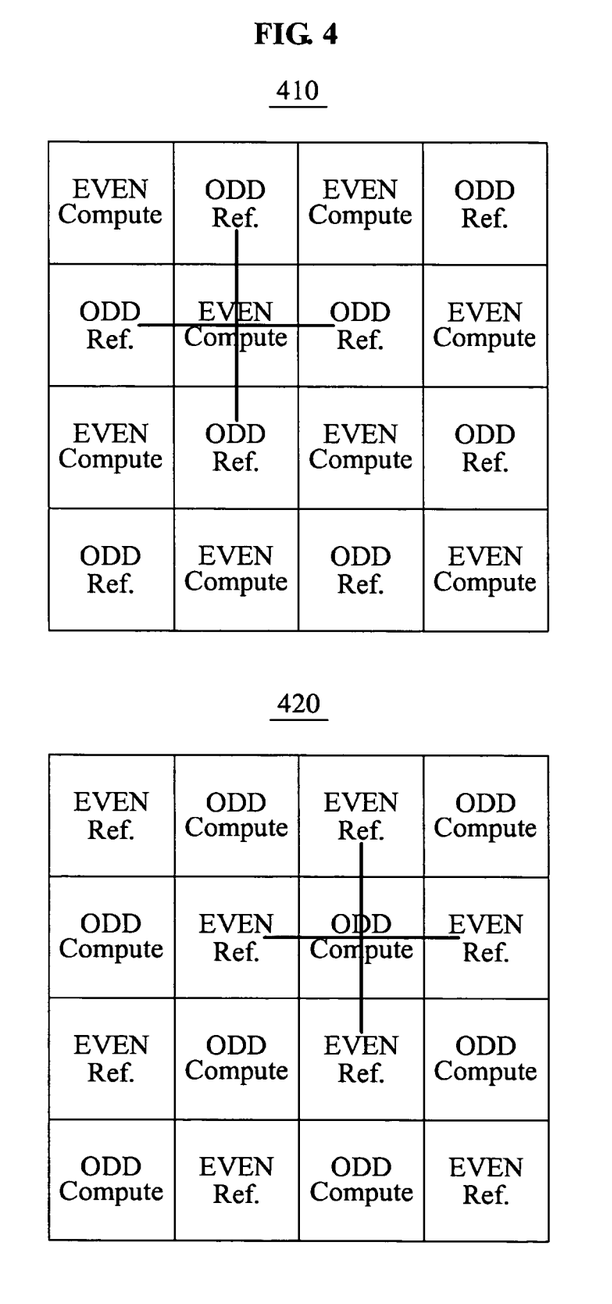
FIG. 4 conceptually illustrates an operation of a depth estimation apparatus according to other example embodiments.

FIG. 4 conceptually illustrates an operation of a depth estimation apparatus according to other example embodiments.

According to other example embodiments, as illustrated in matrices 410 and 420 of FIG. 4, the depth estimation apparatus 220 may simultaneously estimate depth values of pixels corresponding to 'ODD', after simultaneously estimating depth values of pixels corresponding to 'EVEN'.

Referring to FIGS. 2 and 4, the depth estimation apparatus 220 may simultaneously estimate the depth values of the pixels corresponding to 'EVEN' by referring to the depth values of the pixels corresponding to 'ODD', as illustrated in matrix 410 of FIG. 4. Here, the pixels corresponding to 'ODD' are adjacent to the pixels corresponding to 'EVEN'.

Subsequently, the depth estimation apparatus 220 may simultaneously estimate the depth values of the pixels corresponding to 'ODD' by referring to the depth values of the pixels corresponding to 'EVEN', as illustrated in matrix 420 of FIG. 4.

When the depth estimation apparatus 220 may simultaneously estimate depth values of all the pixels composing the input video 210, a computation for the depth value estimation may be complex, since the depth estimation apparatus 220 estimates the depth value of the input video 210 using depth values of neighboring pixels.

That is, as illustrated in matrices 410 and 420 of FIG. 4, the depth estimation apparatus 220 may divide the at least one pixel composing the input video 210 by the pixels corresponding to 'ODD' and the pixels corresponding to 'EVEN', and simultaneously estimate the depth values of each of the pixels corresponding to 'ODD' and 'EVEN'. Accordingly, the computation for the depth value estimation may be less complex.

However, the operation of the depth estimation apparatus 220 may not be limited to the example embodiments.

According to example embodiments, the depth estimation apparatus 220 may estimate the depth value of the at least one pixel composing the input video 210 as described above. Also, according to other example embodiments, the depth estimation apparatus 220 may divide the at least one pixel by at least one block and estimate the depth value at every block unit.

Then, the depth estimation apparatus 220 may up-scale a depth map storing the depth value, and thereby may set the depth value of the at least one pixel.

Thus, the depth estimation apparatus 220 may minimize the computation for the depth value estimation.

Hereinafter, a depth estimation apparatus according to still other example embodiments is described in detail with reference to FIGS. 5 and 6.

Figure 5:
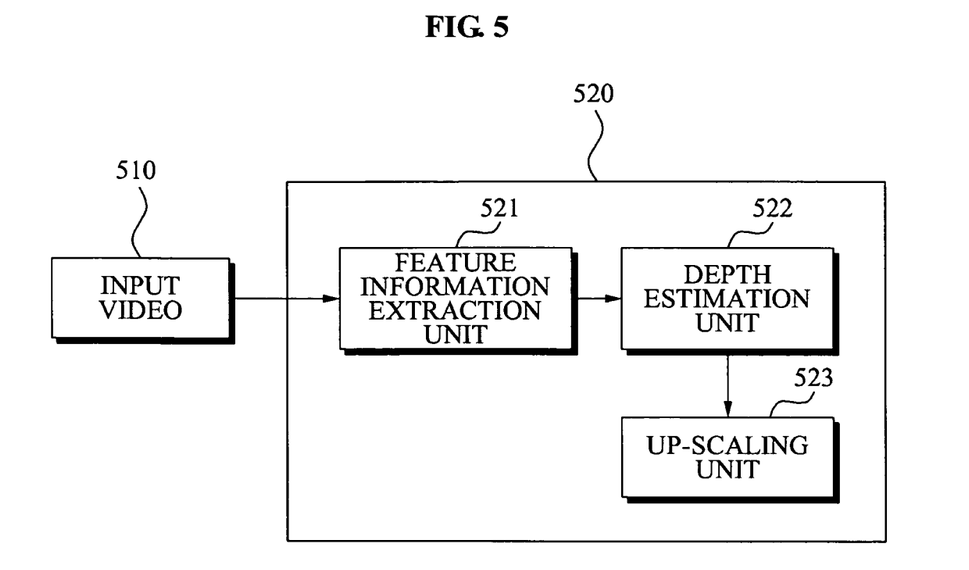
FIG. 5 illustrates a configuration of a depth estimation apparatus according to other example embodiments.

FIG. 5 illustrates a configuration of a depth estimation apparatus 520 according to still other example embodiments.

The depth estimation apparatus 520 may include a feature information extraction unit 521, a depth estimation unit 522, and an up-scaling unit 523.

The feature information extraction unit 521 may extract feature information about at least one feature of an input video 510.

According to still other example embodiments, the input video 510 may be a monocular video.

Also, according to still other example embodiments, the feature information about the at least one feature may include information about at least one of an edge, a color, a luminance, a motion, and a histogram.

The depth estimation unit 522 may divide at least one pixel composing the input video 510 with at least one block, and estimate a depth value of the at least one block based on the feature information about the at least one feature, a position of the at least one block, and a depth relationship among the at least one block and neighboring blocks.

The up-scaling unit 523 may up-scale a depth map, which stores the depth value, of the at least one pixel.

Figure 6:
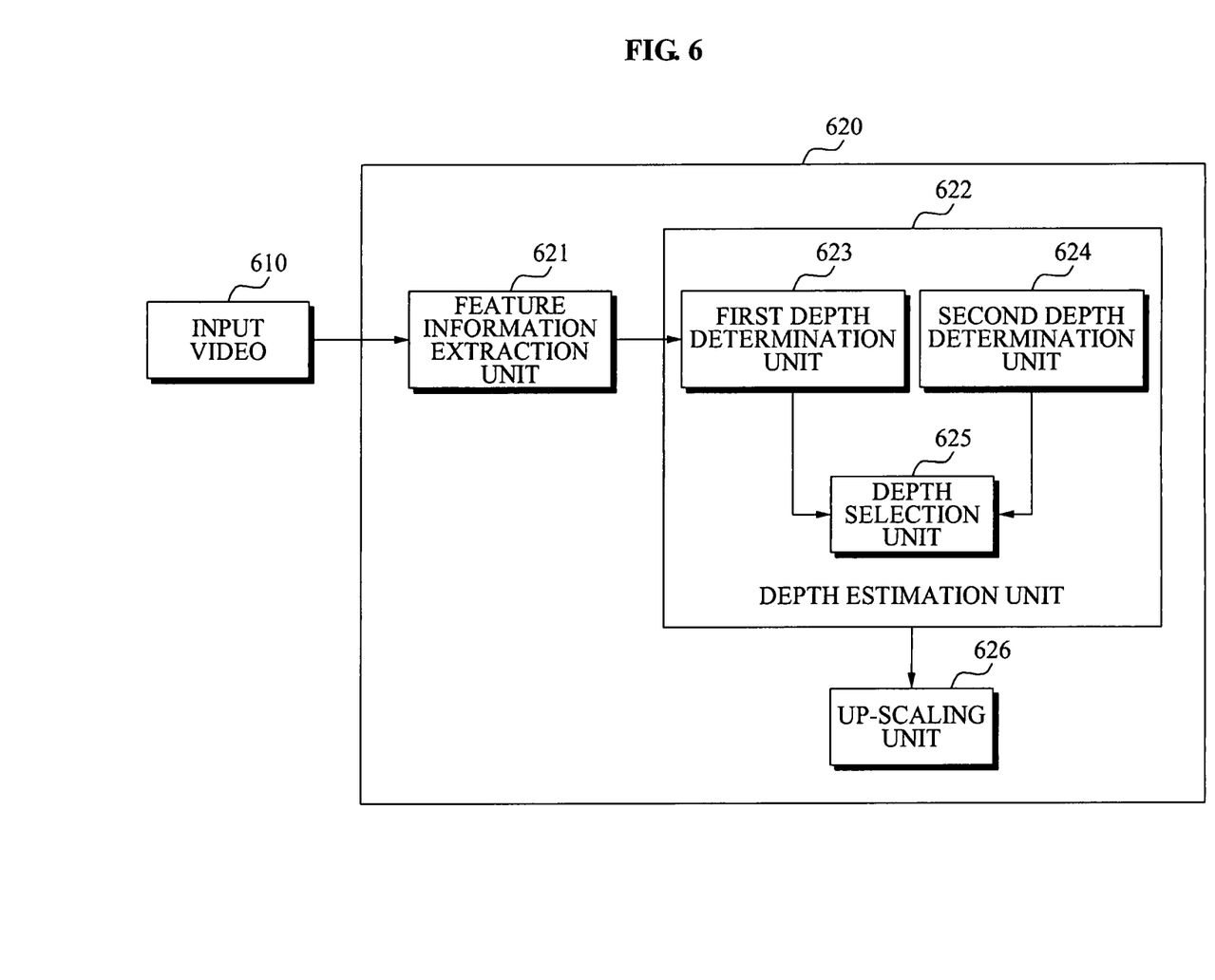
FIG. 6 illustrates a configuration of a depth estimation apparatus according to additional other example embodiments.

FIG. 6 illustrates a configuration of a depth estimation apparatus 620 according to additional other example embodiments.

The depth estimation apparatus 620 is illustrated in FIG. 6.

The depth estimation apparatus 620 may include a feature information extraction unit 621, a depth estimation unit 622, and an up-scaling unit 626.

The feature information extraction unit 621 may extract feature information about at least one feature of an input video 610.

According to additional other example embodiments, the input video 610 may be a monocular video.

Also, according to additional other example embodiments, the feature information about the at least one feature may include information about at least one of an edge, a color, a luminance, a motion, and a histogram.

The depth estimation unit 622 may divide at least one pixel composing the input video 610 by at least one block, and estimate a depth value of the at least one block based on the feature information about the at least one feature, a position of the at least one block, and a depth relationship among the at least one block and neighboring blocks.

According to additional other example embodiments, the depth estimation unit 622 may include a first depth determination unit 623, a second depth determination unit 624, and a depth selection unit 625.

The first depth determination unit 623 may determine a first depth value of the at least one block based on the feature information about the at least one feature.

The second depth determination unit 624 may determine a second depth value of the at least one block based on the position of the at least one block.

According to additional other example embodiments, the second depth determination unit 624 may determine the second depth value based on a vertical image coordinate value of the at least one block.

In this instance, according to additional other example embodiments, the second depth determination unit 624 may determine the second depth value using Equation 1.

In this instance, y may indicate the vertical image coordinate value of the at least one block.

The depth selection unit 625 may select the depth value from at least one predetermined candidate depth value based on respective differences, for example, between the predetermined candidate depth value and each of the first depth value, the second depth value, and a third depth value of the neighboring blocks.

In this instance, according to yet other example embodiments, the depth selection unit 625 may compute a first difference between the first depth value and the at least one predetermined candidate depth value.

Also, the depth selection unit 625 may compute a second difference between the second depth value and the at least one predetermined candidate depth value.

Also, the depth selection unit 625 may compute a third difference between the third depth value and the at least one predetermined candidate depth value.

Also, the depth selection unit 625 may select a value as the depth value of the at least one block from among the at least one predetermined candidate depth value. Here, the value may be a depth value associated with a minimum of sums of the first difference, the second difference, and the third difference.

In this instance, according to additional other example embodiments, the depth selection unit 625 may apply a first weight to the first difference, a second weight to the second difference, and a third weight to the third difference to select the depth value.

Also, according to yet other example embodiments, the depth selection unit 625 may select the depth value using Equation 2.

In this instance, according to additional other example embodiments, the at least one predetermined candidate depth value may include at least one of the depth value of the at least one block, the third depth value of the neighboring blocks, and a randomly selected depth value.

Also, according to additional other example embodiments, the depth selection unit 625 may repeat selecting the depth value of the at least one block.

The up-scaling unit 626 may up-scale a depth map, which stores the depth value, based on the at least one pixel.

The depth estimation apparatus 520 (FIG. 5) according to still other example embodiments and the depth estimation apparatus 620 according to additional other example embodiments have been described with reference to FIGS. 5 and 6. Further detailed descriptions will be omitted herein, since the depth estimation apparatuses 520 and 620 may correspond to the depth estimation apparatuses 120 and 220 described with reference to FIGS. 1 through 4.

Figure 7:
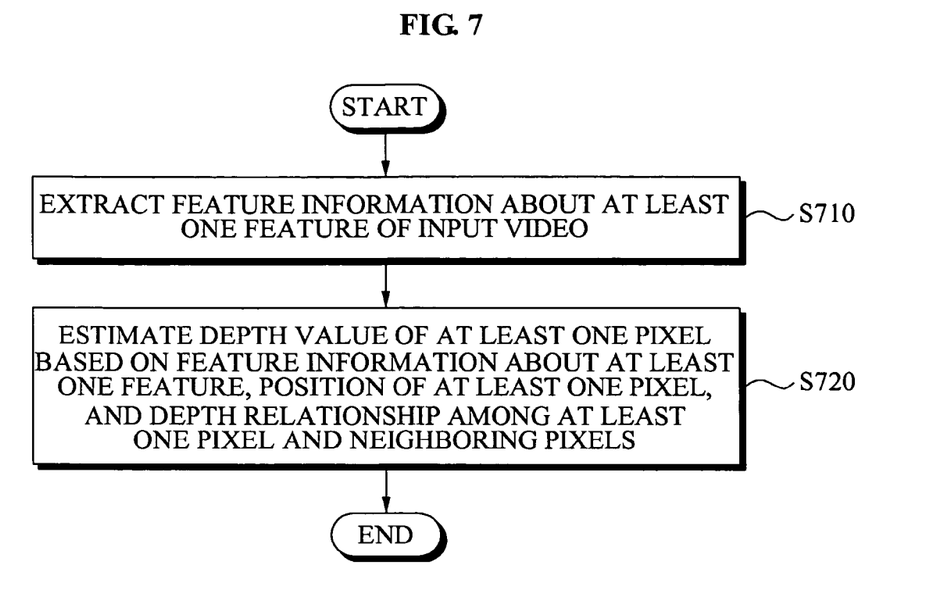
FIG. 7 illustrates a flowchart of a depth estimation method according to example embodiments.

FIG. 7 illustrates a flowchart of a depth estimation method according to example embodiments.

In operation S710, feature information about at least one feature of an input video may be extracted.

According to example embodiments, the input video may be a monocular video.

Also, according to example embodiments, the feature information about the at least one feature may include information about at least one of an edge, color, luminance, motion, and histogram.

In operation S720, a depth value of at least one pixel may be estimated based on the feature information about the at least one feature, a position of the at least one pixel, and a depth relationship among the at least one pixel and neighboring pixels. The at least one pixel may compose the input video.

According to example embodiments, in operation S720, a first depth value, and the like may be determined, which is described in detail with reference to FIG. 8.

Figure 8:
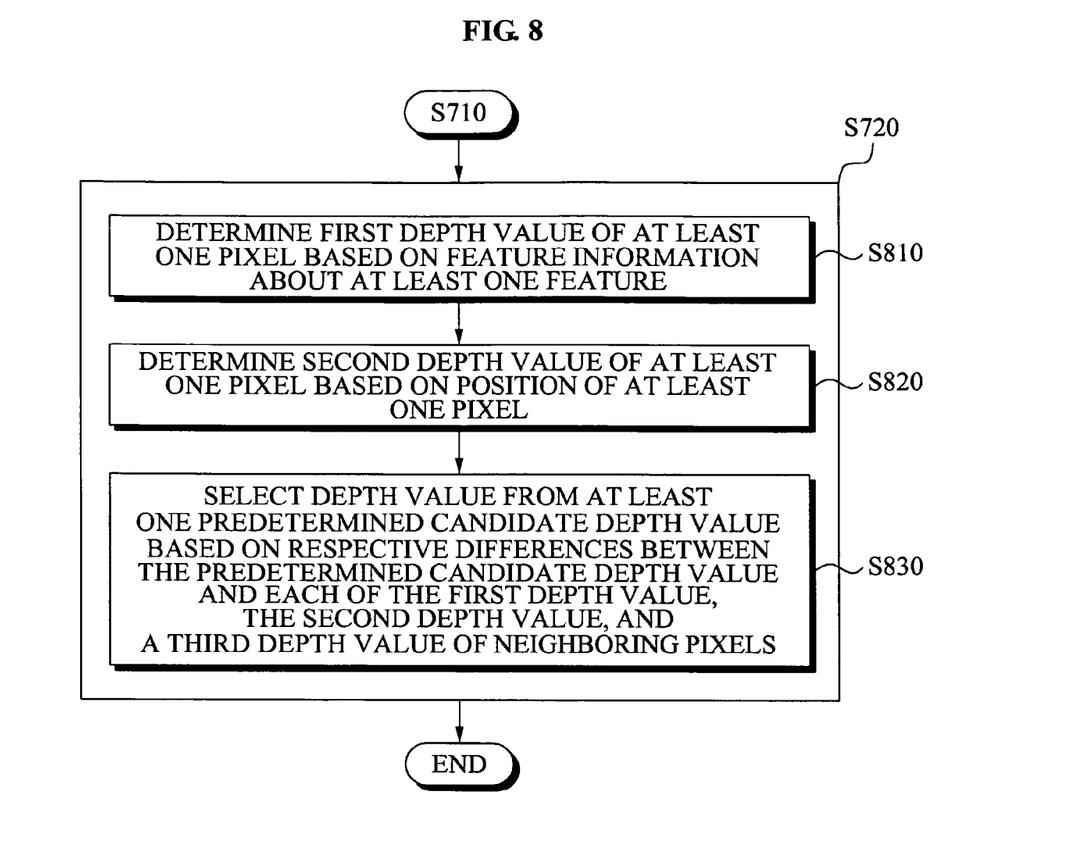
FIG. 8 illustrates a flowchart of an operation of estimating a depth value according to example embodiments.

FIG. 8 illustrates a flowchart of an operation of estimating a depth value according to example embodiments.

According to example embodiments, determining of the first depth value in operation S810, determining of a second depth value in operation S820, and selecting in operation S830 may be included in operation S720 (FIG. 7).

In operation S810, the first depth value of the at least one pixel may be determined based on the feature information about the at least one feature.

In operation S820, the second depth value of the at least one pixel may be determined based on a position of the at least one pixel.

According to example embodiments, the second depth value of the at least one pixel may be determined using Equation 1 in operation S820.

In operation S830, the depth value of the at least one pixel may be selected from at least one predetermined candidate depth value based on respective differences between the predetermined candidate depth value and each of the first depth value, the second depth value, and a third depth value of the neighboring pixels.

In this instance, according to example embodiments, a first difference between the first depth value and the at least one predetermined candidate depth value may be computed in operation S830.

Also, a second difference between the second depth value and the at least one predetermined candidate depth value may be computed in operation S830.

Also, a third difference between the third depth value and the at least one predetermined candidate depth value may be computed in operation S830.

In this instance, a value may be selected as the depth value of the at least one pixel in operation S830. The value may be a depth value associated with a minimum of sums of the first difference, the second difference, and the third difference from among the at least one predetermined candidate depth value.

Also, according to example embodiments, a first weight may be applied to the first difference, a second weight may be applied to the second difference, and a third weight may be applied to the third difference to select the depth value in operation S830.

Also, according to example embodiments, the depth value may be selected using Equation 2 in operation S830.

In this instance, according to example embodiments, the at least one predetermined candidate depth value may include at least one of the depth value of the at least one pixel, the third depth value of the neighboring pixels, and a randomly selected depth value.

Also, according to example embodiments, the selecting of the depth value of the at least one pixel may be repeated in operation S830.

Also, according to example embodiments, the depth estimation method may estimate the depth value of the at least one pixel composing the input video, as well as may estimate the depth value at each block unit after dividing the at least one pixel by at least one block to estimate the depth value of the input video.

Then, the depth estimation method may up-scale a depth map storing the depth value, and thereby may set the depth value of the at least one pixel.

The depth estimation method according to example embodiments has been described with reference to FIGS. 7 and 8. Further detailed descriptions will be omitted herein, since the depth estimation method may correspond to the depth estimation apparatus described with reference to FIGS. 1 through 4.

The depth estimation method according to the above-described example embodiments may be implemented by at least one processing device and/or recorded in computer-readable media including computer readable code, such as program instructions, to implement various operations, e.g., by such as a processing device embodied by a computer. The media may also include, alone or in combination with the included program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A depth estimation apparatus, comprising:
a processor;
a feature information extraction unit to extract feature information about at least one feature of an input video; and
a depth estimation unit to estimate a depth value of at least one pixel of the input video,
wherein the depth estimation unit comprises:
a first depth determination unit to determine a first depth value of the at least one pixel based on the feature information;
a second depth determination unit to determine a second depth value of the at least one pixel based on a position of the at least one pixel; and
a depth selection unit to select the estimated depth value from at least one predetermined candidate depth value, based on the first depth value, the second depth value, and a third depth value of a neighboring pixel neighboring the at least one pixel, and
wherein at least one of the feature information extraction unit and the depth estimation unit use the processor to perform the extracting or estimating.

2. The depth estimation apparatus of claim 1, wherein the depth selection unit computes a first difference between the first depth value and the at least one predetermined candidate depth value, computes a second difference between the second depth value and the at least one predetermined candidate depth value, and computes a third difference between the third depth value and the at least one predetermined candidate depth value, and selects the estimated depth value to be a depth value associated with a minimum of sums of the first difference, the second difference, and the third difference.

3. The depth estimation apparatus of claim 2, wherein the depth selection unit applies a first weight to the first difference, applies a second weight to the second difference, and applies a third weight to the third difference to select the estimated depth value.

4. The depth estimation apparatus of claim 1, wherein the at least one predetermined candidate depth value includes at least one of the estimated depth value of the at least one pixel, the third depth value of the neighboring pixel, and a randomly selected depth value.

5. The depth estimation apparatus of claim 1, wherein the second depth determination unit determines the second depth value based on a vertical image coordinate value of the at least one pixel.

6. The depth estimation apparatus of claim 1, wherein the feature information about the at least one feature includes information about at least one of an edge, color, luminance, motion, and histogram.

7. A depth estimation apparatus, comprising:
a processor;
a feature information extraction unit to extract feature information about at least one feature of an input video;
a depth estimation unit to distinguish at least one pixel of the input video according to at least one block of the input video with plural pixels, and estimate a depth value of the at least one block; and
an up-scaling unit to up-scale a depth map, which stores the estimated depth value, for the at least one pixel,
wherein the depth estimation unit comprises:
a first depth determination unit to determine a first depth value of the at least one block based on the feature information;

a second depth determination unit to determine a second depth value of the at least one block based on a position of the at least one block; and a depth selection unit to select the estimated depth value from at least one predetermined candidate depth value, based on the first depth value, the second depth value, and a third depth value of a neighboring block neighboring the at least one block, and wherein at least one of the feature information extraction unit, the depth estimation unit, and the up-scaling unit use the processor to perform the extracting, estimating, or up-scaling.

8. The depth estimation apparatus of claim 7, wherein the depth selection unit computes a first difference between the first depth value and the at least one predetermined candidate depth value, computes a second difference between the second depth value and the at least one predetermined candidate depth value, and computes a third difference between the third depth value and the at least one predetermined candidate depth value, and selects the estimated depth value of the at least one block to be a depth value associated with a minimum of sums of the first difference, the second difference, and the third difference.

9. The depth estimation apparatus of claim 8, wherein the depth selection unit applies a first weight to the first difference, applies a second weight to the second difference, and applies a third weight to the third difference to select the estimated depth value of the at least one block.

10. The depth estimation apparatus of claim 7, wherein the at least one predetermined candidate depth value includes at least one of the estimated depth value of the at least one block, the third depth value of the neighboring block, and a randomly selected depth value.

11. The depth estimation apparatus of claim 7, wherein the second depth determination unit determines the second depth value based on a vertical image coordinate value of the at least one block.

12. A depth estimation method, comprising:
extracting feature information about at least one feature of an input video; and
estimating a depth value of at least one pixel of the input video,
wherein the estimating comprises:
determining a first depth value of the at least one pixel based on the feature information;
determining a second depth value of the at least one pixel based on the position of the at least one pixel; and
selecting the estimated depth value of the at least one pixel from at least one predetermined candidate depth value, based on the first depth value, the second depth value, and a third depth value of a neighboring pixel neighboring the at least one pixel.

13. The depth estimation method of claim 12, wherein the selecting computes a first difference between the first depth value and the at least one predetermined candidate depth value, computes a second difference between the second depth value and the at least one predetermined candidate depth value, and computes a third difference between the third depth value and the at least one predetermined candidate depth value, and selects the estimated depth value of the at least one pixel to be a depth value associated with a minimum of sums of the first difference, the second difference, and the third difference.

14. The depth estimation method of claim 13, wherein the selecting applies a first weight to the first difference, applies a second weight to the second difference, and applies a third weight to the third difference to select the estimated depth value of the at least one pixel.

15. The depth estimation method of claim 12, wherein the at least one predetermined candidate depth value includes at least one from among the estimated depth value of the at least one pixel, the third depth value of the neighboring pixel, and a randomly selected depth value.

16. The depth estimation method of claim 12, wherein the determining of the second depth value determines the second depth value based on a vertical image coordinate value of the at least one pixel.

17. A non-transitory computer-readable recording medium comprising computer readable code to control at least one processing device to implement a depth estimation method, the method comprising:
extracting feature information about at least one feature of an input video; and
estimating a depth value of at least one pixel of the input video,
wherein the estimating comprises:
determining a first depth value of the at least one pixel based on the feature information;
determining a second depth value of the at least one pixel based on the position of the at least one pixel; and
selecting the estimated depth value of the at least one pixel from at least one predetermined candidate depth value, based on the first depth value, the second depth value, and a third depth value of a neighboring pixel neighboring the at least one pixel.

18. The depth estimation apparatus of claim 1, wherein the selected depth value is stored in a depth map and reused by the depth selection unit as the at least one predetermined candidate depth value.

19. The depth estimation apparatus of claim 1, wherein the second depth determination unit determines the second depth value based on a number of horizontal lines composing the input video.

* * * * *